:::

United States Patent [19]

Hähn et al.

[11] Patent Number: 5,402,752

[45] Date of Patent: Apr. 4, 1995

[54] PROCESS FOR PRODUCTION OF SORBENTS BASED ON SMECTITE FOR UPTAKE OF LIQUIDS

[75] Inventors: Reinhard Hähn, Landshut; Otto Haubensak, Brannenburg, both of Germany

[73] Assignee: Sud-Chemie A.G., Germany

[21] Appl. No.: 170,519

[22] Filed: Dec. 20, 1993

[30] Foreign Application Priority Data

Dec. 21, 1992 [DE] Germany .................. 42 43 390.8

[51] Int. Cl.⁶ ............................................. A01K 1/015
[52] U.S. Cl. ........................................ 119/173; 502/80
[58] Field of Search .................. 119/172, 173; 502/80

[56] References Cited

U.S. PATENT DOCUMENTS

| | | |
|---|---|---|
| 2,079,854 | 5/1937 | Hartshorne et al. |
| 3,158,579 | 11/1964 | Pollitzer et al. |
| 4,704,989 | 11/1987 | Rosenfeld ............................ 119/173 |
| 5,101,771 | 4/1992 | Goss ...................................... 119/173 |
| 5,129,365 | 7/1992 | Hughes ................................. 119/173 |
| 5,188,064 | 2/1993 | House ................................... 119/172 |

FOREIGN PATENT DOCUMENTS

| | | |
|---|---|---|
| 087001 | 8/1983 | European Pat. Off. |
| 378421 | 7/1990 | European Pat. Off. |
| 704495 | 2/1954 | United Kingdom . |

OTHER PUBLICATIONS

DE 38 25 905 Derwent Abstract.
DE 38 36 345 Derwent Abstract.

*Primary Examiner*—Robert P. Swiatek
*Attorney, Agent, or Firm*—Scott R. Cox

[57] ABSTRACT

A process for the production of sorbents based on smectite for uptake of liquids. This process is characterized in that:

(a) a smectite with a water uptake capacity of less than 115% (in terms of the dried smectite with a residual water content of 6 wt.%) and a smectite content of around 40-65 wt.% and/or (b) a two-layer silicate is/are mixed with an alkaline smectite and the mixture homogenized in moist condition by intensive shearing, the mixture is gently dried, and the dried mixture is fragmented.

27 Claims, No Drawings

PROCESS FOR PRODUCTION OF SORBENTS BASED ON SMECTITE FOR UPTAKE OF LIQUIDS

BACKGROUND OF INVENTION

The invention is directed to a process for production of sorbents based on smectite for the uptake of liquids. These sorbents are suitable for taking up any desired liquids; however, they are especially good as pet litter.

The keeping of pets in a largely urbanized environment is increasingly dependent on the use of litter materials. The task of these materials is to absorb the fluids given off by the animals and to suppress or prevent the development of odor if possible. Moreover, they are required to remove moisture from the semisolid, moist animal excrement and excretions, in order to reduce the development of odor. Good litter materials, furthermore, have the property of taking up the excreted or removed fluids by forming a compact clump, which can be removed in a simple and economical way. Therefore, an optimal animal litter has a high absorption capacity.

The products that can be found on the market include organic substances such as straw, sawdust, wood shavings, bark, porous synthetic beads, shredded paper, cellulose fibers, agricultural wastes, polyacrylates, etc. These are used by themselves or in mixtures with inorganic materials. The disadvantage of the organic litter materials is an often unsatisfactory clumping or consistency of the clump, as well as their tendency to bacterial decomposition, especially in conjunction with moisture.

German Patent No. 3,836,345 discloses an animal litter comprised of granular, porous absorbing material. The preferred material consists primarily of calcium silicate hydrate, e.g. cellular concrete, treated with an antimicrobial substance which is a nonhalogenated aromatic hydrocarbon to hinder the occurrence of unpleasant odors. Smectite clay materials are not disclosed.

German Patent No. 3,825,905 discloses a mineral substance to soak up toxic liquids, emulsions and/or suspensions. The mineral substance consists of clay minerals selected from kaolinite, illite, sericite and/or smectite which are roasted at temperatures above 650° C. These materials have an open porosity of at least about 30 vol. percent and a mean pore size of between 0.05 and 500 microns. A treatment to enhance the water uptake capacity of these products is not possible because of the highly roasted nature of the clay minerals.

European Patent No. 087,001 corresponding to U.S. Pat. Nos. 4,591,581 and 4,657,881 disclose absorbent materials comprised of clay mineral particles in the size range of about 710 microns to 4 millimeters consisting of compacted masses of small clay particles of a size less than about 2 millimeters. The clay particles are preferably smectite, attapulgite or sepiolite. No information is provided on improving the water uptake capacity by kneading the materials in their moist state.

There are also bentonite-based litter materials, as disclosed in U.S. Pat. Nos. 5,000,115, 4,657,881, 5,000,115, and 5,129,365, for example, which have certain advantages over the organic litters. Through their ability to swell with aqueous liquids, the bentonites are capable of forming clumps. Because of this clumping, the portion of the litter wetted by the fluid can be removed separately, thus economizing on litter. The special structure of the bentonites is also responsible for their ability to adsorb unpleasant odors produced by the animal's excretions and excrement. Disposal of bentonites, furthermore, is not a burden on the environment.

According to the above-mentioned state of the art, sodium bentonites or mixtures of sodium bentonites and calcium bentonites are used as sorbents, e.g., litter material for pets. These sorbents can be used in granulated form.

However, these are only mechanical mixtures, whose water uptake ability represents the arithmetic mean of the water uptake abilities of the individual components.

Now, surprisingly, it has been found that the water uptake capacity of such mixtures can be substantially improved if the ingredients are chemically reacted with each other under certain conditions.

SUMMARY OF INVENTION

The invention is directed to a process for production of smectite based sorbents for the uptake of liquids produced by the process of (1) mixing (a) a smectite with a water uptake capacity of less than 115% (in terms of dried smectite with a residual water content of 6 wt. %) and a smectite content of about 40-65 wt. % and/or (b) a two-layer silicate with an alkaline smectite, (2) homogenizing the mixture in a moist condition by intensive shearing, (3) gently drying the resultant mixture, and (4) fragmenting the dried mixture.

The energy consumption in the kneading is generally 2-10, preferably 3-6 kWh/ton of kneaded mixture.

The drying is done preferably at a temperature not greater than 150° C., preferably not more than 120° C., and the residual water content is adjusted to not less than 4 wt. %, preferably not less than 6 wt. %.

As a result of this process, the water uptake capacity of the sorbent becomes greater than is to be expected from the arithmetic calculation of the water uptake capacities of the individual components. Thus, a synergy effect is created. Especially surprising is the fact that the enhancement of the water uptake capacity is also achieved when using a two-layer silicate, such as kaolin, which, in contrast to smectites such as calcium bentonite, cannot be activated in the familiar sense by an alkaline treatment.

DESCRIPTION OF THE INVENTION

The invention is directed to the use of sorbents as packaging material, as means of soaking up liquids (e.g., body fluids, oil, liquid chemicals), and as litter for pets, especially cats.

Preferably, one starts with an alkaline earth smectite, especially a Ca-smectite with a water uptake capacity (in terms of the dried smectite with a residual water content of 6 wt. %) of at least 50%, preferably 60-130%, more preferably, 90-120%.

Preferably, the mix ratio between the alkaline earth smectite and/or the two-sheet silicate, on the one hand, and the alkaline smectite, on the other, is around 9:1 to 1:9, more preferably, 7:3 to 3:7.

Preferably, one starts with a two-sheet silicate from the group of the kaolins, which has a water uptake capacity of about 40-80 wt. % (in terms of the dried kaolin with a residual water content of 6 wt. %).

According to another preferred embodiment, one uses an alkaline smectite containing predominantly Na-ions as the replaceable cations and exhibiting a water uptake capacity of at least about 200% (in terms of a residual water content of 6 wt. %).

The smectite preferably has a water uptake capacity of less than 100% (in terms of the dried smectite with a residual water content of 6 wt. %) and a smectite content of 50-60 wt. %.

According to another preferred embodiment, the starting mixture with a water content of about 20-40% is intensively kneaded in a shearing machine (e.g., a Bedeschi mixer or a brick press of the Händle company), or it is mixed and homogenized by intensive shearing in a high-speed blender (e.g., an intensive mixer of the Eirich company).

A further optimization of the liquid uptake can be achieved by adjusting the dried product to a grain size of about 0.1-10 mm, preferably 1-5 mm. The fine fraction produced by the fragmentation is generally sifted off and returned to the kneading layout.

Moreover, the subject of the invention is a sorbent that can be produced by the above-described process and that is characterized by a water content of about 3-12, preferably 4-10% (after drying), and a water uptake capacity of more than 120%, preferably more than 150% (in terms of the material dried to a residual moisture content of 6 wt. %).

Moreover, the sorbent of the invention can be blended with familiar sorbents, e.g., the above-mentioned organic sorbents. Furthermore, the sorbent may contain white pigments, disinfectant, and/or animal acceptance agents.

EXAMPLES

The following Examples describe the process for the production and use of the sorbents according to the invention:

Test Procedure:

The water content of the invented sorbent is determined as follows:

10 g of sorbent are exactly weighed out to 0.01 g in a shallow dish and dried to constant weight in a drying cabinet at 110° C. (at least two hours). Next, the specimen is cooled down to room temperature in a desiccator and weighed:

Evaluation:

(First weighing/Final weighing)/First weighing $\times 100$ = water content (%)

The water uptake ability of the invented sorbent is determined by the method of the Westinghouse Company (No. 17-A) (cf. Industrial Minerals, August 1992, page 57). In this process, the sorbent, dried to a residual water content of 6 wt. %, is weighed in (weigh-in $E = 20$ g) in a conical container of fine wire fabric (mesh 60 = 0.25 mm, diameter 7 cm, height 7.6 cm). Next, the total weight is determined (wire fabric + weigh-in $E = E_1$ in g). The filled fabric is hung for 20 minutes in a water-filled glass tray so that the sorbent is completely submerged. After 20 minutes, the wire fabric is taken out of the water and allowed to drip for around 20 minutes. Immediately after this, the weight of the container with its contents is determined ($E_2$ in g). The evaluation is done as follows:

Water uptake in percent = $(E_2 - E_1)/E \times 100$ E

Example 1 (Comparison)

Around 2 kg of freshly excavated crude Ca-bentonite (around 30 wt. % water) is intensively kneaded for 5 minutes in a kneading machine with shearing action (Werner-Pfleiderer blender). The energy consumption was 4 kWh/ton. The resulting agglomerated granulates are dried gently at 80° C. for 4 hours and fragmented to a grain size of 1-5 mm at a water content of roughly 6 wt. %.

Example 2 (Comparison)

The procedure of Example 1 is repeated, except that instead of the freshly mined calcium bentonite, kaolin with a water content of around 24 wt. % is used. The water uptake of the dried and fragmented granulates is 74%.

Example 3 (Comparison)

The procedure of Example 1 is repeated, except that instead of the freshly mined calcium bentonite, natural sodium bentonite with a water content of around 35% is used. The water uptake capacity of the dried and fragmented granulates was 273 wt. % in a first experiment and 291 wt. % in a second experiment.

Example 4

The procedure of Example 1 is repeated, except that mixtures of calcium and sodium bentonite with the water contents indicated in Example 1 and 3, respectively, are used. The mix ratios and the water uptake capacities measured on the mixed granulates are compared with the mathematically expected values in Table 1.

Example 5

The procedure of Example 1 is repeated, except that mixtures of kaolin and sodium bentonite with the water contents indicated in Example 2 and 3, respectively, are used. The mix ratios and the water uptake capacities measured on the mixed granulates are compared with the mathematically expected values in Table 2.

TABLE 1

Kneading Mixtures of Calcium and Sodium Bentonite

| Designation | Mix Ratio Ca-B./Na-B. | Water Uptake Capacity: Measured | Water Uptake Capacity: Calculated |
|---|---|---|---|
| Granulate 1 | 90:10 | 113 | 112 |
| Granulate 2 | 70:30 | 211 | 152 |
| Granulate 3 | 50:50 | 249 | 192 |

TABLE 2

Kneading Mixtures of Kaolin and Sodium Bentonite

| Designation | Mix Ratio Kaolin/Na-B. | Water Uptake Capacity: Measured | Water Uptake Capacity: Calculated |
|---|---|---|---|
| Granulate 1 | 90:10 | 113 | 112 |
| Granulate 2 | 70:30 | 211 | 152 |
| Granulate 3 | 50:50 | 249 | 192 |

Surprisingly, as the values presented in Tables 1 and 2 show, the intensive kneading of the moist two-layer or alkaline earth-metal-three layer silicates with sodium bentonite produces a substantial increase in the water uptake capacity, which cannot be expected from the addition of the water uptake capacities of the two-layer or alkaline earth-metal-three layer silicates and the sodium bentonite alone. Pure calcium bentonite, as Example 1 reveals, has a water uptake ability of around 90%; pure kaolinite, according to Example 2, has a water uptake capacity of around 75%. The water uptake capacity of sodium bentonite, according to Example 3, is around 270-290%. The kneading of calcium bentonite in different quantitative proportions with sodium bentonite produces, as Example 4 reveals, an unexpectedly large water uptake capacity, which is clearly above the theoretically anticipated values. The same is true of the sorbent made from kaolin and sodium bentonite, according to Example 5.

We claim:

1. A process for the production of sorbents based on smectite for uptake of liquids comprised of
   (a) mixing (i) a smectite with a water uptake capacity of less than 115%, in terms of the dried smectite with a residual water content of about 6 wt. %, and a smectite content of about 40-65 wt. % and
   (ii) a two-layer silicate with an alkaline smectite,
   (b) homogenizing the mixture in moist conditions by intensive shearing,
   (c) gently drying the mixture, and
   (d) fragmenting the dried mixture.

2. The process of claim 1 wherein the homogenization is done with an energy consumption of around 2-10 kWh/ton of the homogenized mixture.

3. The process of claim 1 wherein the material being dried is exposed to not more than 150° C. and the residual water content of the dried mixture is adjusted to not less than 4 wt. %.

4. The process of claim 1 wherein the smectite is a Ca-smectite with a water uptake capacity, in terms of the dried smectite with a residual water content of about 6 wt. %, of at least about 50%.

5. The process of claim 1 wherein the smectite is a Ca-smectite with a water uptake capacity, in terms of the dried smectite with a residual water content of about 6 wt. %, of at least about 60 to 130%.

6. The process of claim 1 wherein the smectite is a Ca-smectite with a water uptake capacity, in terms of the dried smectite with a residual water content of about 6 wt. %, of at least about 90 to 120%.

7. The process of claim 1 wherein the two-layer silicate is a kaolin, which has a water uptake capacity of about 40-80 wt. %, in terms of the dried kaolin with a residual water content of about 6 wt. %.

8. The process of claim 1 wherein the alkaline smectite contains predominantly Na-ions as the replaceable cations and exhibits a water uptake capacity of at least about 200%, in terms of a residual water content of about 6 wt. %.

9. The process of claim 1 wherein the mix ratio between the smectite and two-layer silicate mixture and the alkaline smectite is about 9:1 to 1:9.

10. The process of claim 1 wherein the water content of each of the smectite, the two-layer silicate and the alkaline smectite is about 20-40% and wherein those materials are intensively kneaded in a shearing machine or mixed and homogenized by intensive shearing in a high-speed mixing machine.

11. The process of claim 1 wherein the dried material is fragmented to a grain size of about 0.1-10 mm.

12. The sorbent produced by the process of claim 1 wherein its water content is about 3-12% and exhibits a water uptake capacity of more than 120%, in terms of the material dried to a residual moisture content of about 6 wt. %.

13. A process for the production of sorbents based on smectite for uptake of liquids comprised of (a) mixing (i) a smectite with water uptake capacity of about 115%, in terms of the dried smectite with a residual water content of about 6 wt. %, and a smectite content of about 40 to 65 wt. % and (ii) a two-layer silicate with an alkaline smectite, (b) homogenizing the mixture in moist conditions by intensive shearing, (c) gently drying the mixture and (d) fragmenting the dried mixture.

14. The process of claim 13 wherein the material being dried is exposed to not more than 150° C. and the residual water content of the dried mixture is adjusted to not less than 4 wt. %.

15. The process of claim 13 wherein the smectite is a Ca-smectite with a water uptake capacity, in terms of the dried smectite with a residual water content of about 6 wt. %, of at least about 50%.

16. The process of claim 13 Wherein the two-layer silicate is a kaolin, which has a water uptake capacity of about 40-80 wt. %, in terms of the dried kaolin with a residual water content of about 6 wt. %.

17. The process of claim 13 wherein the alkaline smectite contains predominantly Na-ions as the replaceable cations and exhibits a water uptake capacity of at least about 200%, in terms of a residual water content of 6 wt. %.

18. The process of claim 13 wherein the homogenization is done with an energy consumption of around 2-10 kWh/ton of the homogenized mixture.

19. The process of claim 13 wherein the mix ratio between the smectite and two-layer silicate mixture and the alkaline smectite is about 9:1 to 1:9.

20. The process of claim 13 wherein the water content of each of the smectite, the two-layer silicate and the alkaline smectite is about 20-40% and wherein those materials are intensively kneaded in a shearing machine or mixed and homogenized by intensive shearing in a high-speed mixing machine.

21. The process of claim 13 wherein the dried material is fragmented to a grain size of about 0.1-10 mm.

22. The sorbent produced by the process of claim 13 wherein its water content is about 3-12% and exhibits a water uptake capacity of more than 120%, in terms of the material dried to a residual moisture content of about 6 wt. %.

23. The sorbent of claim 22 wherein white pigments, disinfectants, or animal acceptance agents are added to the mixture.

24. A process for the production of sorbents based on smectite for uptake of liquids comprised of
    (a) mixing (i) a smectite with a water uptake capacity of less than 115%, in terms of the dried smectite with a residual water content of about 6 wt. %, and a smectite content of about 40-65 wt. % or
    (ii) a two-layer silicate with an alkaline smectite,
    (b) homogenizing the mixture in moist conditions by intensive shearing,
    (c) gently drying the mixture, and
    (d) fragmenting the dried mixture.

25. The process of claim 24 wherein the mix ratio between the smectite or two-layer silicate mixture and the alkaline smectite is about 9:1 to 1:9.

26. A process for the production of sorbents based on smectite for uptake of liquids comprised of
    (a) mixing (i) a smectite with water uptake capacity of about 115%, in terms of the dried smectite with a residual water content of about 6 wt. %, and a smectite content of about 40 to 65 wt. % or (ii) a two-layer silicate with an alkaline smectite,
    (b) homogenizing the mixture in moist conditions by intensive shearing,
    (c) gently drying the mixture and
    (d) fragmenting the dried mixture.

27. The process of claim 26 wherein the mix ratio between the smectite or two-layer silicate mixture and the alkaline smectite is about 9:1 to 1:9.

* * * * *